US012756198B2

(12) United States Patent
Wong et al.

(10) Patent No.: US 12,756,198 B2
(45) Date of Patent: Oct. 6, 2026

(54) AUTOMATIC DETECTION OF GRID-CONNECTED DISTRIBUTED ENERGY RESOURCES

(71) Applicant: X Development LLC, Mountain View, CA (US)

(72) Inventors: Sze Mei Cat Wong, Johns Creek, GA (US); Leo Francis Casey, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 482 days.

(21) Appl. No.: 18/197,574

(22) Filed: May 15, 2023

(65) Prior Publication Data

US 2024/0388100 A1 Nov. 21, 2024

(51) Int. Cl.

| | |
|---|---|
| ***H02J 3/38*** | (2026.01) |
| ***H02J 3/00*** | (2026.01) |
| ***H02J 3/32*** | (2026.01) |
| ***H02J 101/22*** | (2026.01) |
| ***H02J 101/28*** | (2026.01) |
| ***H02J 103/35*** | (2026.01) |

(52) U.S. Cl.

CPC .............. *H02J 3/381* (2013.01); *H02J 3/003* (2020.01); *H02J 3/322* (2020.01); *H02J 2101/22* (2026.01); *H02J 2101/28* (2026.01); *H02J 2103/35* (2026.01)

(58) Field of Classification Search

CPC ............ H02J 3/381; H02J 3/003; H02J 3/322; H02J 2203/10; H02J 2300/22; H02J 2300/28; H02J 2300/24

See application file for complete search history.

(56) References Cited

U.S. PATENT DOCUMENTS

| | | | | |
|---|---|---|---|---|
| 2019/0302156 | A1* | 10/2019 | Kim | H04L 12/2825 |
| 2024/0022076 | A1* | 1/2024 | Pfänder | H02J 3/32 |

OTHER PUBLICATIONS

Blog.norcalcontrols.net [online], "Meteorological Stations for PV-Solar Power Plants," Aug. 2022, retrieved on May 19, 2023, retrieved from URL<https://blog.norcalcontrols.net/meteorological-station-for-a-pv-solar-power-plant>, 7 pages.

Castello et al., "Deep learning in the built environment: automatic detection of rooftop solar panels using Convolutional Neural Networks," Journal of Physics: Conference Series, 2019, 1342:012034.

(Continued)

*Primary Examiner* — Charles Cai

(74) *Attorney, Agent, or Firm* — Fish & Richardson P.C.

(57) ABSTRACT

Methods, systems, and apparatus, including computer programs encoded on a storage device, for determining whether a distributed energy resource is connected at a location. Electrical load data is obtained for a location over a time period. The electrical load data is analyzed to determine one or more signals from the electrical load data. The signals are compared to one or more load profiles for the location. Each load profile can indicate one or more baseline electrical patterns for the location. A likelihood that at least one distributed energy resource is in use at the location is determined based on the comparison. In response to determining that the likelihood is more than a threshold, one or more actions are performed.

23 Claims, 4 Drawing Sheets

(56) References Cited

OTHER PUBLICATIONS

Malof et al., "Automatic Detection of Solar Photovoltaic Arrays in High Resolution Aerial Imagery," Applied Energy, Dec. 1, 2016, 183:229-40.

Palmetto.com [online], "How Can I Tell If My Solar Panels are Working?," Jan. 2022, retrieved on May 19, 2023, retrieved from URL<https://palmetto.com/learning-center/blog/how-to-check-if-solar-panels-are-working>, 10 pages.

sinovoltaics.com [online], "How to Measure Solar Energy and Power?," Feb. 2017, retrieved on May 19, 2023, retrieved from URL<https://sinovoltaics.com/learning-center/system-design/measure-solar-energy-power/>, 6 pages.

Yuan et al., "Large-scale solar panel mapping from aerial images using deep convolutional networks," 2016 IEEE International Conference on Big Data, Dec. 5-8, 2016, 6 pages.

* cited by examiner

AUTOMATIC DETECTION OF GRID-CONNECTED DISTRIBUTED ENERGY RESOURCES

TECHNICAL FIELD

The present specification relates to electrical power grids, and specifically to detecting distributed energy resources that are connected to an electrical power grid.

BACKGROUND

Electrical power grids transmit electrical power to loads such as residential and commercial buildings. Various electrical power grid conditions can be simulated and visualized using electrical power grid models. Electric grid models can be used to evaluate and predict operations and potential faults in an electric grid.

SUMMARY

In general, the present disclosure relates to automatic estimation of number and capacity of grid-connected DERs (Distributed Energy Resources (DERs). DERs, such as solar, have become more common in some areas. A utility company may not be aware of which and how many DERs are connected to an electrical grid.

Overhead image data can be used to identify some DER installations. For example, image data can be analyzed to detect certain patterns or signals that indicate a likelihood of a DER being at a location. For instance, images of roofs can be automatically analyzed. As another example, the utility company may be aware of some potential DERs based on receiving or being aware of registration data for the potential DERs (e.g., as part of an application process).

However, the utility company may not be aware of all DERs nor which DERs are actually connected and contributing or taking power to/from the grid. Additionally, the utility company may not have good estimates regarding how much power is being generated or consumed by connected DERs. Accordingly, the utility company may be limited in conducting effective planning and operations due to an overall lack of awareness of a number and capacity of grid-connected DERs. For example, planning/operation model(s) used by the utility may not accurately reflect power generation or consumption of DERs. While an impact of an individual DER may be small enough to not be a concern to the utility company, an overall aggregate impact of multiple DERs may be important enough to warrant utility company consideration and response. Furthermore, knowing the location of DER resources on the grid may be important and even critical for load balancing among feeders. Residential loads are often fed by only one phase of a three-phase power system or with some utilities from a phase-phase connection. Phases can be out of balance during periods of high DER output (high solar activity) if DER connections are not balanced across phases on a feeder.

To automatically determine whether a DER is connected at a location, electrical load data for the location can be obtained and one or more signals can be generated based on the electrical load data. The signals can indicate load for different days, times of day, day of week, etc. In some cases, weather data for the location can be obtained and correlated to the obtained electrical load data, to generate other signals. For example, signals can be generated that indicate load given certain weather conditions (e.g., sun exposure, temperature, wind conditions, humidity). The signals can be compared to one or more load profiles. A load profile can correspond to historical load data for the location. A comparison may indicate, for example, that current load data indicates a reduced load for similar conditions (e.g., time and weather factors) as compared to load data for previous time periods. Accordingly, a conclusion can be automatically made that a DER now connected at the location may account for the reduced load.

Other examples can include determining that a previously-known DER that was connected at the location appears to be no longer connected, or is substantially impaired. Other load profiles can correspond to other types of expected loads. For example, load profiles can represent expected signals if DER(s) are in fact at the location or if no DERs are at the location. An expected load profile that may indicate presence of a connected DER may include load data patterns that have load intermittency on cloudy days vs. sunny days, for example. The current load data can be compared to expected load profiles, to determine if the current load data matches an expected load profile that may correspond to presence or non-presence of connected DER(s). If comparison(s) results in a likelihood that a change in DER connection has occurred, one or more actions can be performed, as described in more detail below.

Although data from inverters and smart meters may be used to identify connection of DERs, such data may not be available for some or all addresses or locations. Accordingly, load data retrieval and signal generation and comparison can be done on an average and/or aggregate basis based on data corresponding to a substation or service transformer that serves multiple locations. After a determination has been made that a DER is connected, similar load data signal generation and comparison against expected load profiles can be performed to estimate the capacity of the detected DERs and/or an overall connection time.

This disclosure describes implementations that provide various technical advantages. For example, a utility company can perform one or more actions based on determining DER information that indicates that a given location likely has one or more DERs and the estimated capacity of the DERs. For example, the utility company can update a planning/operation computer model of an electric grid based on the determined DER information. Various planning and operations decisions can be made based on the updated model. For example, in response to determining that a certain location (e.g., neighborhood) has a certain number of DERs, an approval process can be modified to account for an updated number of DERs at the location. For example, a request for a new DER (e.g., new solar) at a house in the neighborhood may be denied due to a concern that, given the determined number of current DERs, an additional DER may overload a local transformer or imbalance a feeder, until a balancing DER is added to another phase of the feeder. As another example, the utility company may alter an approval process to be less conservative (e.g., to approve a higher number or higher percentage of new-DER requests) based on having a higher confidence of knowing how many DERs are at a given location. For example, prior procedures may have been configured conservatively, e.g., using worst-case scenarios, based on not having a high level of confidence of knowing exactly how many DERs are at a certain location. New procedures can be less conservative, based on a higher confidence of knowing an actual number of presently in-use DERs and their capacity. Other actions can be taken, with respect to planning for future power generation, distribution, and equipment upgrades. For example, a trend of increased requests for DERs for a given location can be determined and a plan can be put in place to upgrade a transformer for that location in order to handle a higher number of DERs at that location in the future.

In general, innovative aspects of the subject matter described in this specification can be embodied in a method FOR determining whether a distributed energy resource is connected at a location. The method includes: obtaining electrical load data for a location over a time period; analyzing the electrical load data to determine at least one signal from the electrical load data; comparing the at least one signal to at least one load profile for the location, wherein each load profile indicates one or more baseline electrical patterns for the location; determining a likelihood that at least one distributed energy resource is in use at the location based on the comparison; and in response to determining that the likelihood is more than a threshold, performing one or more actions.

These and other embodiments can include the following features. The location can correspond to a single address served by a component of an electrical grid or to multiple addresses served by a component of an electrical grid. The at least one signal can include electrical load per time of day at the location, electrical load per day of week at the location, or electrical load given particular weather patterns at the location. The load profile can be a historical load profile for the location. The load profile for the location can be an expected load profile determined based on an assumption of one or more context parameters for the load data for the location. The expected load profile can be determined based on an assumption of no distributed energy resources being connected at the location. The expected load profile can be determined based on an assumption of a certain number or certain capacity of distributed energy resources being connected at the location. The expected load profile can reflect expected load for the location assuming one or more of certain weather conditions, a given time of day, a given day of week, a given time of year. The certain weather conditions can include one or more of a given amount of sun exposure, a given temperature, or given wind conditions. Comparing the at least one signal to a load profile for the location can include: identifying a first load profile that has context parameters that match context parameters associated with the obtained load data for the location; and comparing the first load profile to the at least one signal. Distributed energy resources can include one or more of solar panels, community wind farms, stationary batteries, vehicle batteries, or vehicle-to-grid systems. Image data can be obtained for the location and analyzed. The likelihood that at least one distributed energy resource is in use at the location can be adjusted based on the analysis.

Other implementations of the above aspects include corresponding systems, apparatus, and computer programs, configured to perform the actions of the methods, encoded on computer storage devices. The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes computer-implemented methods, software, and systems for electrical power grids, and specifically for detecting distributed energy resources that are connected to an electrical power grid.

Figure 1:
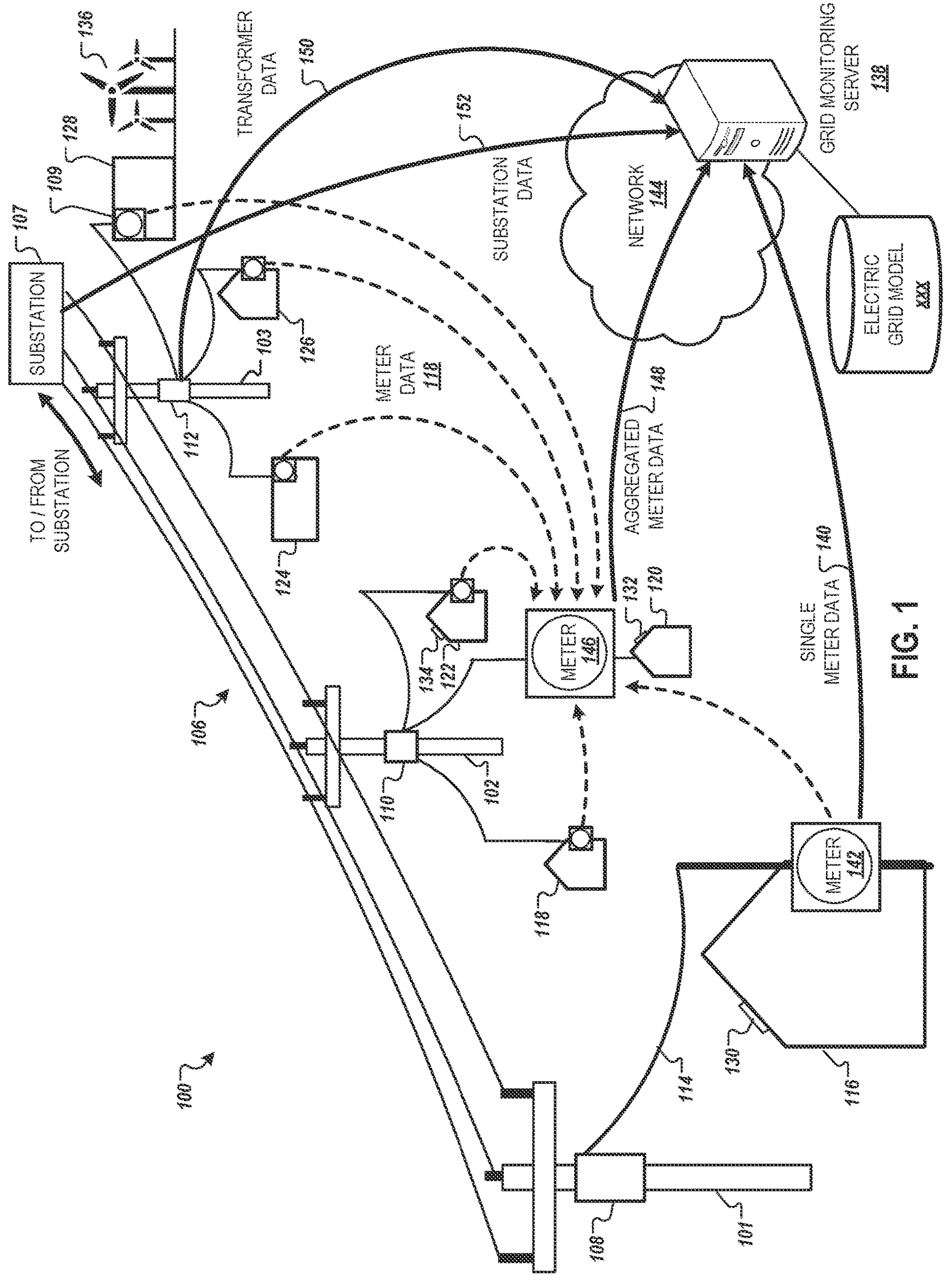
FIG. 1 is a contextual diagram of an example system for detecting distributed energy resources that are connected to an electrical power grid.

FIG. 1 is a contextual diagram of an example system 100 for detecting distributed energy resources that are connected to an electrical power grid. Electric generating power plants commonly produce three-phase alternating current (AC) electrical power. The three-phase power is distributed through power lines of an electrical grid to service cables that connect to loads such as residential, commercial, and industrial properties. The voltage of electric power can be increased or reduced by electrical transformers located between power plants and loads. On one side of an electrical transformer, the transformer can be connected to a primary electrical distribution system that is connected to a power source. On another side of the electrical transformer, the transformer can be connected to a secondary distribution system that distributes the power to loads.

For example, the system 100 includes utility poles 101, 102, and 103. The utility poles 101, 102, and 103 support three-phase primary distribution lines 106. The primary distribution lines 106 transport electrical power from a substation 107 to electrical loads.

The utility poles 101, 102, and 103 each support a distribution transformer 108, 110, or 112 respectively. The distribution transformers 108, 110, and 112 step down the voltage of the electrical power from the primary distribution lines 106 to one or more secondary distribution lines. For example, transformer 108 steps down the voltage from the primary distribution lines 106 to secondary distribution line 114. An example load is a house 116. The house 116 receives electrical power from the secondary distribution line 114.

The system 100 includes other loads. For example, houses 118, 120, and 122 are connected to the transformer 110 through respective secondary distribution lines. As another example, a business 124, a house 126, and a business 128 are connected to the transformer 112 through respective secondary distribution lines.

Some loads are connected to a DER. A DER is a power generation source that operates locally at a location. DERs can include, for example, solar panels, community wind farms, or other types of local power generation. In the system 100, the houses 105, 120, and 122 have solar panels 130, 132, or 134, respectively. The business 128 is associated with a community wind farm 136.

A utility company may not have full information about DERs in the system 100, which can limit effective planning and operation of the electrical grid. For example, the utility company may not be aware of exactly which loads have a DER. As another example, the utility company may not know if a DER at the location is actually connected to the grid. As yet another example, the utility company may not be aware of how much power is being generated by respective DERs.

For example, the utility company may not be aware of the solar panels 130 on the house 116. The solar panels 130 may have been recently installed without knowledge of the utility company, for example. As another example, the utility company may be aware of an application for a DER at the house 120 but may not be aware of whether the solar panels 132 have been installed or are connected to the grid. The utility company may be aware of the solar panels 134 at the house 122, from DER registration or application data, from direct communication with the owner of the house 122, or from a prior visit to the house 122 by personnel of the utility company.

A grid monitoring server 138 can perform one or more processes to automatically identify DERs, determine when DERs are connected and contributing power to the grid, and determine how much power connected DERs are contributing to the grid. The grid monitoring server 138 can be a computer server or group of computer servers maintained by an electrical utility or service provider. As an example, the grid monitoring server 138 can analyze overhead image data and recognize DER objects (e.g., solar panels) in the overhead image data, to determine that a location most likely has a DER. For example, overhead image analysis by the grid monitoring server 138 can detect likely presence of the solar panels 130 and the solar panels 132, as well as confirm the presence of the solar panels 134.

The grid monitoring server 138 can also automatically determine a likelihood of whether DER(s) are connected at a particular location based on electrical load data of location loads. The grid monitoring server 138 can obtain electrical load data for analysis in various ways and from various sources. For example, the grid monitoring server 138 can obtain single-meter electrical load data 140 from a respective meter 142 that measures electrical load for the house 116. The meter 142 may be a smart meter, for example. Smart meters, smart panels, or other electrical monitoring devices can be connected to a service cable at a load, such as a residential property, in order to monitor electricity usage of the load. For example, the meter 142 can measure characteristics of power flowing from the secondary distribution line 114 to the house 116. Data collected by the meter 142 can include, for example, voltage, current, power factor, and the amount of energy consumed by the property. In general, smart meters can have communication capabilities that allow the smart meter to communicate information wirelessly or over a network 144 to the consumer, to electricity suppliers, and to the grid monitoring server 138.

In some cases, there may be reasonable privacy concerns around the usage of smart meter data. For example, having access to a single load's power or current measurements could reveal the behaviors of that particular customer. However, the disclosed techniques can use aggregated power and current measurements for situations where privacy is a concern. The aggregation can be performed over all the loads that share a single transformer, or in some cases, loads that share multiple transformers. The smart meters can perform the aggregation themselves and only send the resulting calculations to the grid monitoring system. Thus, the measurements would not be associated with any identifying information about individual loads or meters. The aggregating meter can be chosen randomly and changed over time so that no single device has access to a large amount of continuous data. The measurement data can be deleted from the aggregating meter after the aggregation and computations are completed, to ensure privacy.

As an example, a smart meter 146 for the house 120 can serve (at least temporarily) as an aggregating meter for a cluster of other loads. The smart meter 146 can send aggregated meter data 148 to the grid monitoring server 138 for analysis. In this way, the aggregated meter data 148 is not associated with any identifying information about energy usage of any individual property.

In other examples, instead of or in addition to an aggregating meter, the system 100 can include other types of aggregating device(s). The aggregating device can be, for example, a device that is not associated with a particular load. The aggregating device can be an aggregating device that is owned by and/or operated by the electrical utility. The aggregating device can be assigned to collect, aggregate, and transmit electrical data from a load cluster to the grid monitoring server 138. The aggregating device can be associated with a transformer, or with a substation or feeder. For example, aggregated transformer data 150 associated with the transformer 112 can be sent to or otherwise obtained by the grid monitoring server 138 for analysis. As another example, aggregated substation data 152 associated with the substation 107 can be sent to or otherwise obtained by the grid monitoring server 138.

After obtaining electrical load data for a particular location, the grid monitoring server 138 can analyze the electrical load data to determine at least one signal from the electrical load data. A signal can be time series load data that is annotated with other contextual information, such as location information, time period contextual information (e.g., day of week, time of year), and weather information (e.g., temperature information, cloud cover information). The grid monitoring server 138 can compare a signal to one or more load profiles for the location. A load profile can include or indicate one or more baseline electrical patterns for the location that can be compared to a signal associated with current or most recent load data under analysis. A load profile can correspond to historical load data and/or expected load data that includes known or expected load data patterns that would be expected given certain time and weather conditions and either presence or non-presence of grid-connected DERs at the location. The grid monitoring server 138 can determine a likelihood that at least one DER is in use at the location based on comparing current load data signal(s) to historical or other expected load data patterns. Load data profile contents and comparison approaches are discussed in more detail below with respect to FIGS. 2, 3, and 4.

In response to a determination that a likelihood of a grid-connected DER is more than a threshold for a location, the grid monitoring server 138 or another component of the system 100 can perform one or more actions. For example, the grid monitoring server 138 can update a grid model to reflect a DER-connected status for a location. As another example, other processes may be triggered, such as processes to automatically determine a power capacity of connected DERs, such as based on similar load data signals to load data profile comparisons. DER capacity information can also be added to the grid model. The updated grid model can be used for improved electrical grid planning and operation. Other details and advantages are described below.

Figure 2:
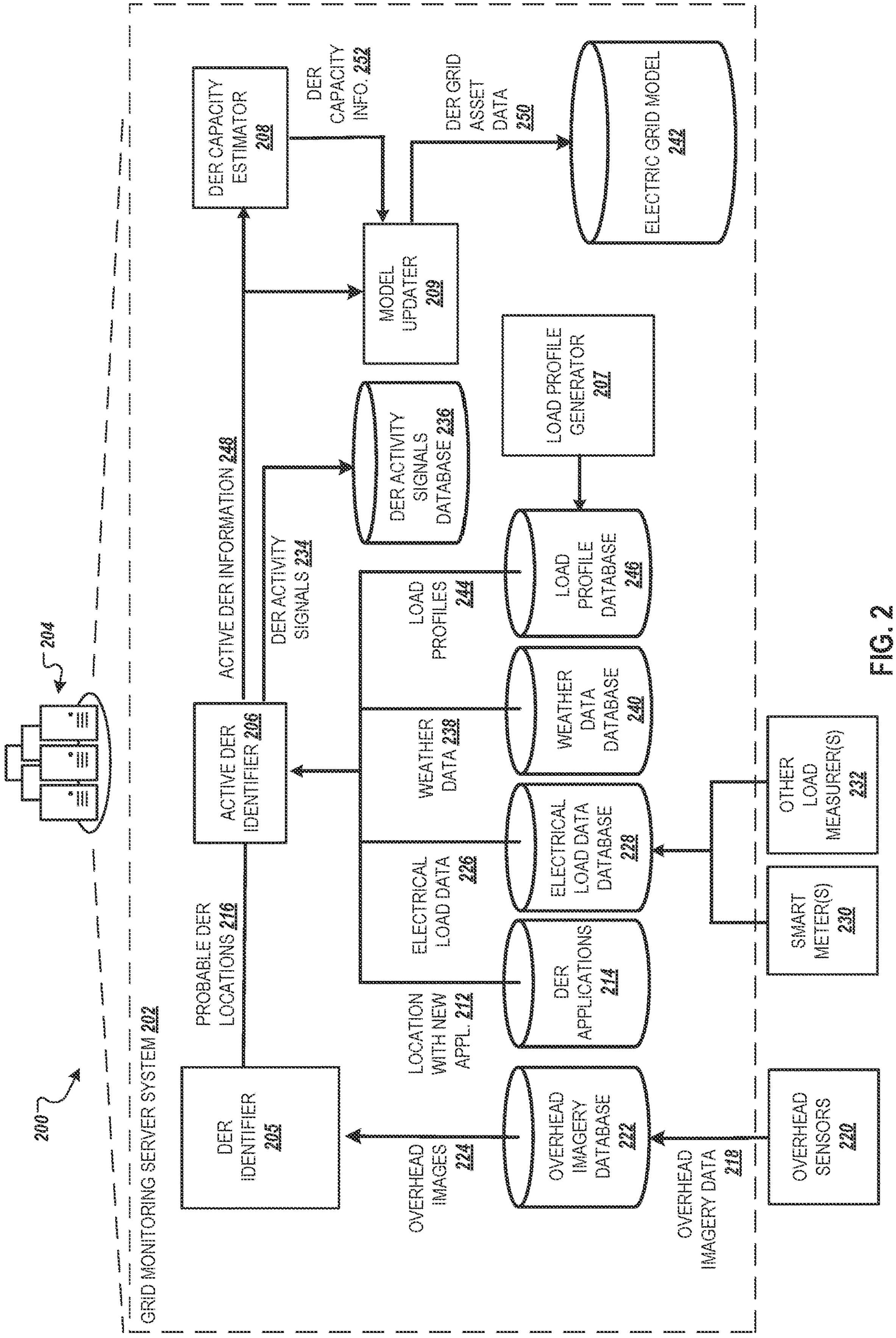
FIG. 2 is a diagram of an example system for detecting distributed energy resources that are connected to an electrical power grid.
Figure 3:
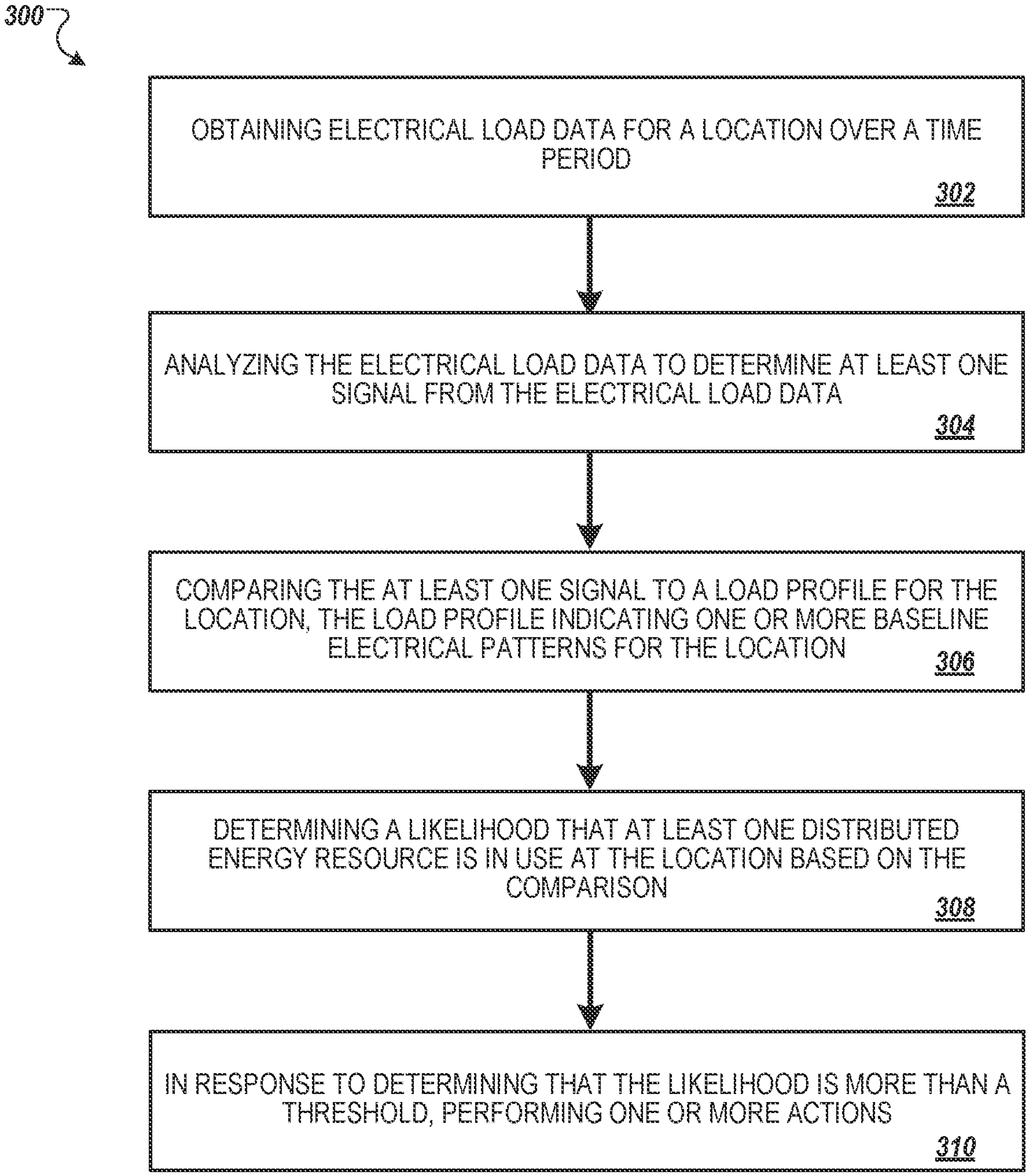
FIG. 3 is a flow diagram of an example process for detecting distributed energy resources that are connected to an electrical power grid.

FIG. 2 is a diagram of an example system 200 for detecting distributed energy resources that are connected to an electrical power grid. The system 200 can be used to perform a process 300 for detecting distributed energy resources that are connected to an electrical power grid. A flow diagram of the process 300 is illustrated in FIG. 3. The system 200 includes a grid monitoring server system 202. The grid monitoring server system 202 may be hosted within a data center 204, which can be a distributed computing system having hundreds or thousands of computers in one or more locations.

The grid monitoring server system 202 includes a DER identifier 205, an active DER identifier 206, a load profile generator 207, a DER capacity estimator 208, and a model updater 209. The DER identifier 205, the active DER identifier 206, the load profile generator 207, the DER capacity estimator 208, and the model updater 209 can each be provided as one or more computer executable software modules or hardware modules. That is, some or all of the functions of the DER identifier 205, the active DER identifier 206, the load profile generator 207, the DER capacity estimator 208, and the model updater 209 can be provided as a block of computer code, which upon execution by a processor, causes the processor to perform functions described below. Some or all of the functions of the DER identifier 205, the active DER identifier 206, the load profile generator 207, the DER capacity estimator 208, and the model updater 209 can be implemented in electronic circuitry, e.g., by individual computer systems (e.g., servers), processors, microcontrollers, a field programmable gate array (FPGA), or an application specific integrated circuit (ASIC).

The process 300 may be performed by the active DER identifier 206 in response to various types of triggers. For example, the process 300 may be performed for a given location on a periodic basis, such as every week, every month, etc. As another example, the process 300 can be performed in response to some other type of event. For example, the active DER identifier 206 can identify a location 212 that has a new application (or other registration information) for a DER in a DER application database 214. The process 300 can be performed, for example, a certain number of days, weeks, or months after receiving the application, to determine whether a DER has actually been installed and connected to the grid.

As another example, the active DER identifier 206 may perform the process 300 in response to receiving location information 216 from the DER identifier 205 for locations for which overhead image analysis has indicated probable detection of DERs. For example, the DER identifier 205 can obtain overhead imagery data 218 of a geographic region such as from overhead sensors 220. The overhead sensors 220 can include, for example, aerial and satellite sensors. The overhead sensors 220 can include visible light cameras, infrared sensors, RADAR sensors, and LIDAR sensors. The overhead imagery data 218 can include visible light data, e.g., red-green-blue (RGB) data, hyperspectral data, multispectral data, infrared data, RADAR data, and LIDAR data. The overhead imagery data 218 can include two-dimensional (2D) data, 2.5D data, 3D data, and/or multiple channels or layers of imagery data. The overhead imagery data 218 can include data from multiple images collected over time. The grid monitoring server system 202 can store the overhead imagery data 218 in an overhead imagery database 222.

The DER identifier 205 can obtain overhead images 224 from the overhead imagery database 222. The DER identifier 205 can identify DERs within the overhead images 224. For example, the DER identifier 205 can identify DERs by performing image processing techniques on the overhead images 224. In some implementations, the DER identifier 205 can use a trained machine learning algorithm to identify DERs in overhead image data. For example, the DER identifier 205 can process the overhead image data using an image classification model that is trained to identify DERs. The image classification model can use a machine learning algorithm, e.g., a neural network model. The machine learning algorithm can be pre-trained, for example, using human-labeled images. The DER identifier can provide the location information 216 for locations for which overhead image analysis has indicated probable detection of DERs to the active DER identifier 206. The active DER identifier 206 can perform the process 300 for some or all of the locations included in the location information 216.

The process 300 includes obtaining electrical load data for a location over a time period (302). For example, the active DER identifier 206 can obtain electrical load data 226 from an electrical load data database 228. The electrical load data database 228 can include electrical load information that the grid monitoring server system 202 has obtained from one or more smart meters 230, such as individual smart meters or an aggregator smart meter, as described above. As another example, the electrical load data database 228 can include electrical load information obtained from one or more other load measurers 232, such as corresponding to a transformer, substation, or feeder. The electrical load data 226 can be for a current or most recent time period, such as the past week, past month, etc. The location can correspond to a single load, such as a single residence or business, or can correspond to multiple loads, such as multiple residences or businesses served by a transformer, substation, or feeder.

The process 300 includes analyzing the electrical load data to determine at least one signal from the electrical load data (304). For example, the active DER identifier 206 can analyze the electrical load data 226 and generate DER activity signals 234 and store the DER activity signals 234 in a DER activity signals database 236. The DER activity signals 234 can be information that may indicate presence of one or more DERs at the location that are connected to and contributing power to the electric grid. The DER activity signals 234 can include, for example, time series that include load amounts for different time points in the time period. For example, the time period may be the past week and the time series can include load amounts per hour for each day of the past week. The active DER identifier 206 can annotate the time series with other contextual information. For example, the DER activity signals 234 can include time series that are annotated with day of week information, type of day information (e.g., week day, weekend), season information (summer, winter, spring, autumn), load type (e.g., residential, industrial), single-address, multiple-address, number of addresses, etc. As another example, the active DER identifier 206 can annotate time series with weather data 238 obtained from a weather data database 240 or from some other source of weather data, and/or with information from an electric grid model 242. Example annotations for a load amount for a location for a particular time point may be, for example, {"day type": "weekday", "load type": "residential", "load count": 10, "temperature": 85, "season": "summer", "cloud coverage": "sunny"}.

The process 300 includes comparing the at least one signal to at least one load profile for the location, where a load profile indicates one or more baseline electrical patterns for the location (306). For example, the active DER identifier 206 can compare the DER activity signals 234 to load profiles 244 that are retrieved from a load profile database 246. The load profile generator 207 can generate load profiles and store generated load profiles in the load profile database 246. Load profiles are discussed in more detail below.

The process 300 includes determining a likelihood that at least one distributed energy resource is in use at the location based on the comparison (308). For instance, the active DER identifier 206 can compare each signal to one or more load patterns. As described in more detail below, for some load patterns, if a degree of match between the signal and the load pattern is less than a threshold, the active DER identifier 206 can increase a likelihood that a DER is connected at the location. For other load patterns, if the degree of match between the signal and the load pattern is more than a threshold, the active DER identifier can increase a likelihood that a DER is connected at the location. When multiple comparisons between signal(s) and load pattern(s) are made, an aggregate likelihood that a DER is connected at the location can be determined.

In general, a load profile can be a load pattern that can be compared to a signal for a current load to determine whether the signal for the current load indicates a presence of one or more DERs that are connected at the location. In some cases, the load pattern reflects historical load patterns for the location. If the signal for the current load differs from a historical load pattern, the active DER identifier 206 may increase a likelihood that a change in DER connectivity has occurred at the location. For example, the active DER identifier 206 may be aware that the electric grid model 242 does not have a record of any DERs currently connected at the location. The difference in the signal for the current load and the historical load pattern for the location may indicate that a DER has been recently connected at the location. For example, the signal for the current load may indicate a reduction in load during sunny conditions, as compared to the historical load. A DER may be generating power during sunny conditions and thus reducing power consumption at the location. As another example, the active DER identifier 206 may be aware that the electric grid model 242 has record of a DER connected at the location and the difference in the signal for the current load and the historical load pattern for the location may indicate that a DER has been recently disconnected, such as due to an increase in load during sunny conditions, as compared to the historical load when the DER was previously connected. The current signal may reflect that the DER is no longer generating power and reducing the overall power consumption for the location under sunny conditions, for example.

The historical load patterns that are compared to a signal can be based on historical data having similar contextual parameters as the current signal. For example, the historical load patterns can include load data that occurred under similar weather conditions and during same or similar time periods.

The load profile generator 207 can generate other load profiles that can be compared to signals for the current load. For example, the load profiles 244 can include expected load profiles that represent expected load for the location assuming a certain number of DERs of certain types are connected at the location and assuming certain contextual parameters such as day of week, time of year, and weather conditions. The expected load profile may be generated in part on data for other similar locations, data from the location, or data that is generated based on a model of expected load given certain contextual patterns.

An example expected load profile may represent expected load for the location for weekdays in June that have generally clear skies and temperatures within a range of a daily low of 60 degrees and a daily high of 80 degrees with an assumption that the location has solar panels of a certain size or capacity installed and connected to the grid. The expected load profile can be selected for comparison to a signal for a current load based on a match between contextual parameters of the expected load profile to contextual parameters of the signal for the current load. For example, the signal may include data for one or more sunny weekdays in June when temperatures ranged between 60 and 80 degrees. If the signal for the current load substantially matches the expected load pattern, the active DER identifier 206 can increase a likelihood that a DER is connected at the location.

The process 300 includes, in response to determining that the likelihood is more than a threshold, performing one or more actions (310). For example, the active DER identifier 206 can generate one or more notifications and provide the notifications to appropriate parties. As another example, the active DER identifier 206 can provide active DER information 248 to the model updater 209. The model updater 209 can generate DER grid asset data 250 from the active DER information 248 and update the electric grid model 242 using the DER grid asset data 250, so that the electric grid model 242 reflects a change in DER connectivity status determined by the active DER identifier 206. The updated grid model can be used for improved electrical grid planning and operation.

As another example, the active DER identifier 206 can provide active DER information 248 to the DER capacity estimator 208. For instance, after the active DER identifier 206 has determined that a DER is now connected at a location, the DER capacity estimator 208 can estimate a capacity (e.g., power consumption potential) of the connected DER. In some cases, the active DER information 248 includes signals previously generated by the active DER identifier 206 that can be used by the DER capacity estimator to estimate DER capacity. In some cases, once the DER capacity estimator 208 receives an indication of new DER connectivity for the location, the DER capacity estimator 208 can evaluate data in the electrical load data database 228, the weather data database 240, the load profile database 246, and/or the DER activity signals database 236 to estimate DER capacity. In some cases, a degree of match or degree of difference between signal data and expected load profile(s) can be used to estimate DER capacity. For instance, on sunny days, a degree of load drop between a signal for the location and a historic load profile for the location (e.g., when no DER was connected) can indicate a capacity of a now-connected DER.

The DER capacity estimator 208 can provide DER capacity information 252 to the model updater 209 and the model updater 209 can update the electric grid model 242 with the DER capacity information 252. Although the DER capacity estimator 208 is shown as a separate component from the active DER identifier 206, in some cases or for some signal to expected load comparisons, the active DER identifier 206 can both detect DER connectivity and DER capacity in the same processing run.

In some cases, the active DER identifier 206 and/or the DER capacity estimator 208 can access electrical vehicle charging information from the electric grid model 242 or from analysis of the electrical load data 226 or DER activity signals 234. For example, the active DER identifier 206 and/or the DER capacity estimator 208 can be informed or can discover or determine that a certain amount of electrical vehicle charging is likely occurring for a location. The active DER identifier 206 and/or the DER capacity estimator 208 can adjust DER connectivity and capacity determination based on whether a location likely has electrical vehicle charging.

Figure 4:
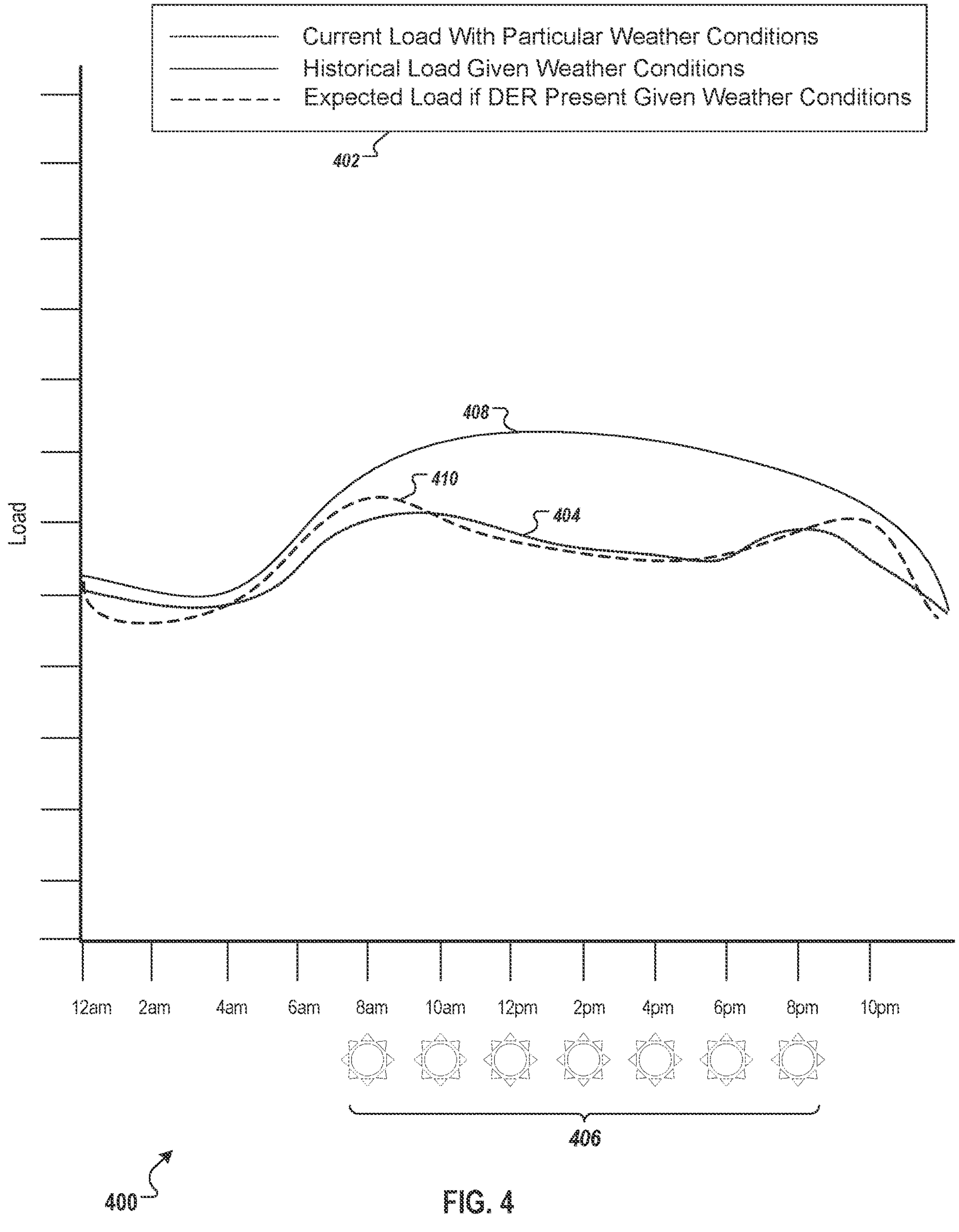
FIG. 4 illustrates an example graph of current, historical, and expected electrical loads.

FIG. 4 illustrates an example graph 400 of current, historical, and expected electrical loads. The graph 400 has a Y-axis for load values and an X-axis for time values of a time period. As indicated by a legend 402, a line 404 displays current load values for the time period. The current load values are associated with weather condition information for the time period. For example and as shown by icons 406, sunny conditions occurred in the time period from approximately 8 am to 8 pm. Also as shown in the legend 402, a line 408 displays historical load values that occurred in similar historical time periods (e.g., similar days of week, similar times of year) with similar weather conditions. The system may have a record regarding whether DERs were known to be connected during the historical time periods. For instance, the line 408 may represent historical load values during a time period when the system has no record of a connected DER at the location. As another example shown in the graph 400, a line 410 displays information from a load profile that has been generated to reflect expected load values, under similar weather conditions, if a DER is present at the location.

A likelihood that a DER is currently connected at the location can be determined based on comparing the current load with either or both of the historical or expected loads. For example, a DER-connected likelihood can be based at least in part on a comparison of the current load represented by the line 404 to the historical load represented by the line 408. The DER-connected likelihood can be increased based on determining a difference between the lines 404 and 408. In particular, the DER-connected likelihood can be increased based on determining that a load reduction occurred in the current time period, as compared to historical time period(s), during daylight hours under sunny weather conditions. For instance, connected solar equipment at the location may have generated power and thus reduced an overall load for the location during the current time period. Since the lines 404 and 408 differ in particular ways, the DER-connected likelihood may be increased to above a threshold value that indicates a likely presence of a DER at the location.

As another example, the DER-connected likelihood can be based at least in part on a comparison of the current load represented by the line 404 to the expected load represented by the line 410. The DER-connected likelihood can be based on a degree of match to the line 404 and the line 410. Both the lines 404 and 410 show a reduced load during daylight hours between 8 am and 8 pm, for example. As mentioned, the line 410 represents expected load values under similar weather conditions to the current weather conditions (e.g., generally sunny conditions). Since the lines 404 and 410 have similar shapes (e.g., a closeness value greater than a threshold), the DER-connected likelihood may be increased to above a threshold value that indicates a likely presence of a DER at the location.

In some cases, the line 404 may be compared to both the line 410 and 408, or to other data representing other load profiles. An aggregate likelihood value can be determined based on respective likelihood values from separate comparisons. For example, the aggregate likelihood may be an average likelihood of multiple likelihood values from separate comparisons. As another example, the aggregate likelihood may be a highest likelihood of multiple likelihood values from separate comparisons.

Implementations of the subject matter and the functional operations described in this specification can be implemented in digital electronic circuitry, in tangibly-implemented computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including, by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, and can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of sub-combinations.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be helpful. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art.

For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method for determining whether a distributed energy resource is connected at a location, comprising:
obtaining electrical load data for a portion of an electric power grid over a time period, wherein the portion of the electric power grid comprises at least one substation and at least one electrical feeder;
analyzing the electrical load data to determine at least one signal from the electrical load data;
comparing the at least one signal to at least one load profile for the location, wherein each load profile indicates one or more baseline electrical patterns for the location;
determining a likelihood that at least one distributed energy resource is in use at the location based on the comparison; and
in response to determining that the likelihood is more than a threshold:
generating distributed energy resource capacity information for the at least one distributed energy resource based on the comparison; and
balancing one or more feeders based on the distributed energy resource capacity information.

2. The method of claim 1, wherein the location corresponds to a single address served by a component of the electric power grid.

3. The method of claim 1, wherein the location corresponds to multiple addresses served by a component of the electric power grid.

4. The method of claim 1, wherein the at least one signal comprises electrical load per time of day at the location, electrical load per day of week at the location, or electrical load given particular weather patterns at the location.

5. The method of claim 1, wherein the load profile is a historical load profile for the location.

6. The method of claim 1, wherein the load profile for the location comprises an expected load profile determined based on an assumption of one or more context parameters for the electrical load data for the location.

7. The method of claim 6, wherein the expected load profile is determined based on an assumption of no distributed energy resources being connected at the location.

8. The method of claim 6, wherein the expected load profile is determined based on an assumption of a certain number or certain capacity of distributed energy resources being connected at the location.

9. The method of claim 6, wherein the expected load profile reflects expected load for the location assuming one or more of certain weather conditions, a given time of day, a given day of week, or a given time of year.

10. The method of claim 9, wherein the certain weather conditions comprise one or more of a given amount of sun exposure, a given temperature, or given wind conditions.

11. The method of claim 6, wherein the comparing the at least one signal to a load profile for the location comprises:
identifying a first load profile that has context parameters that match context parameters associated with the obtained electrical load data for the location; and
comparing the first load profile to the at least one signal.

12. The method of claim 1, wherein the at least one distributed energy resource comprises one or more of solar panels, community wind farms, stationary batteries, vehicle batteries, or vehicle-to-grid systems.

13. The method of claim 1, further comprising:
obtaining image data for the location;
analyzing the image data for the location; and
adjusting the likelihood that at least one distributed energy resource is in use at the location based on analyzing the image data for the location.

14. A system comprising one or more computers and one or more storage devices on which are stored instructions that are operable, when executed by the one or more computers, to cause the one or more computers to perform operations for determining whether a distributed energy resource is connected at a location comprising:
obtaining electrical load data for a portion of an electric power grid over a time period, wherein the portion of the electric power grid comprises at least one substation and at least one electrical feeder;
analyzing the electrical load data to determine at least one signal from the electrical load data;
comparing the at least one signal to at least one load profile for the location, wherein each load profile indicates one or more baseline electrical patterns for the location;
determining a likelihood that at least one distributed energy resource is in use at the location based on the comparison; and
in response to determining that the likelihood is more than a threshold:
generating distributed energy resource capacity information for the at least one distributed energy resource based on the comparison; and
balancing one or more feeders based on the distributed energy resource capacity information.

15. The computer-implemented method of claim 1, further comprising:
in response to determining that the likelihood is more than a threshold:
generating electric grid model distributed energy resource asset data for the at least one distributed energy resource; and
altering a computer model of the portion of the electric power grid to model operation of the at least one distributed energy resources based on the distributed energy resource capacity information and the electric grid model distributed energy resource asset data.

16. The system of claim 14, wherein the location corresponds to a single address served by a component of the electric power grid.

17. The system of claim 14, wherein the location corresponds to multiple addresses served by a component of the electric power grid.

18. The system of claim 14, wherein the at least one signal comprises electrical load per time of day at the location, electrical load per day of week at the location, or electrical load given particular weather patterns at the location.

19. The system of claim 14, wherein the operations comprise:
in response to determining that the likelihood is more than a threshold:
generating electric grid model distributed energy resource asset data for the at least one distributed energy resource; and altering a computer model of the portion of the electric power grid to model operation of the at least one distributed energy resources based on the distributed energy resource capacity information and the electric grid model distributed energy resource asset data.

20. A non-transitory computer storage medium encoded with instructions that, when executed by one or more computers, cause the one or more computers to perform operations for determining whether a distributed energy resource is connected at a location comprising:

obtaining electrical load data for a portion of an electric power grid over a time period, wherein the portion of the electric power grid comprises at least one substation and at least one electrical feeder;

analyzing the electrical load data to determine at least one signal from the electrical load data;

comparing the at least one signal to at least one load profile for the location, wherein each load profile indicates one or more baseline electrical patterns for the location;

determining a likelihood that at least one distributed energy resource is in use at the location based on the comparison; and in response to determining that the likelihood is more than a threshold:

generating distributed energy resource capacity information for the at least one distributed energy resource based on the comparison; and balancing one or more feeders based on the distributed energy resource capacity information.

21. The computer storage medium of claim 20, wherein the location corresponds to a single address served by a component of the electric power grid.

22. The computer storage medium of claim 20, wherein the location corresponds to multiple addresses served by a component of the electric power grid.

23. The computer storage medium of claim 20, wherein the operations comprise:

in response to determining that the likelihood is more than a threshold:

generating electric grid model distributed energy resource asset data for the at least one distributed energy resource; and altering a computer model of the portion of the electric power grid to model operation of the at least one distributed energy resources based on the distributed energy resource capacity information and the electric grid model distributed energy resource asset data.

* * * * *